United States Patent [19]
Bowers et al.

[11] Patent Number: 5,883,696
[45] Date of Patent: Mar. 16, 1999

[54] VIDEO MONITORING SYSTEM FOR A MOVIE FILM CAMERA

[75] Inventors: Wynn Bowers, Boylston, Mass.; John Farrand, Woodland Hills; Iain A. Neil, Calabasas, both of Calif.

[73] Assignee: Panavision, Inc., Woodland Hills, Calif.

[21] Appl. No.: 873,442

[22] Filed: Jun. 12, 1997

[51] Int. Cl.⁶ .................................................. G03B 19/18
[52] U.S. Cl. ........................ 352/136; 352/171; 352/206
[58] Field of Search .................................... 352/136, 171, 352/206

[56] References Cited

U.S. PATENT DOCUMENTS

| | | | |
|---|---|---|---|
| 2,963,937 | 12/1960 | Raitiere | 352/206 |
| 3,236,581 | 2/1966 | Mitchell | 352/206 |
| 4,963,906 | 10/1990 | Goodman | 352/171 |

FOREIGN PATENT DOCUMENTS

4200561A1   7/1993   Germany ............................. 352/171

*Primary Examiner*—Russell Adams
*Attorney, Agent, or Firm*—Lyon & Lyon LLP

[57] ABSTRACT

A video monitoring system for a movie film camera usable with either spherical or anamorphic lenses wherein conventional, unmodified video monitors and recorders may be used. A video camera is positioned in the film camera to receive an image directly from the camera lens without interposing either a ground glass for imaging or an optical deanamorphosing lens. The anamorphic image, which is horizontally squeezed (such as by a factor of 2), that is received by the video camera then is electronically processed to deanamorphose the image by producing an analog video signal to a video monitor that displays the properly proportioned image in the middle one-half of the monitor screen and produces black areas or strips across the top one quarter and bottom one quarter of the screen. The horizontal lines of the video picture are electronically interpolated for enhancing the picture.

35 Claims, 5 Drawing Sheets

VIDEO MONITORING SYSTEM FOR A MOVIE FILM CAMERA

This invention relates to cinematography and in particular is directed to a motion picture film camera that includes a video camera for monitoring and recording the same picture that is being exposed on the movie film. More particularly, the invention relates to a system for deanamorphosing the picture viewed by the video camera when the motion picture film camera is using an anamorphic lens.

In high quality cinematography, such as films made for showing in theaters or on television, it has become popular to incorporate a video camera in the film camera for producing a video signal of the same picture that is being captured on film so that the video signal can be shown on monitors viewed by persons involved in the production and also recorded on video tape for immediate or subsequent reviewing. The video camera is positioned within the film camera to receive the same picture as the film through the same lens system to thereby produce a video picture that accurately represents the picture being exposed on the film. One problem with such a combined video and film camera is that when the film camera is using anamorphic lenses that compress the picture horizontally, as is common place with high quality theatrical films, the video camera sees (through the anamorphic lens) and produces a video signal of the compressed picture and the picture that normally would be viewed on the monitor would also be horizontally compressed. Techniques have been developed for modifying the video monitors to correct the horizontally compressed picture, such as by changing the scan of the monitor to cover only the middle half of the picture tube but this requires an expensive modification, sometimes to monitors owned by others, and does not result in a high quality video picture. Further, when spherical (non-anamorphic) lenses are used on the same film camera, the modified monitors must be switched to a conventional mode of operation or conventional monitors must be substituted. No previous video assist system has been capable of producing an uncompressed picture of high quality on a conventional monitor when anamorphic lenses are used in the combination film and video camera.

Another problem that is inherent in producing a quality video picture from such a combination video and film camera is that a standard film camera runs at a different speed than a standard video camera. Specifically, a film camera normally runs at 24 frames per second (fps) and has a mirrored shutter that exposes the film for about one half of the time and reflects the image to the video camera and eyepiece the other one half of the time while the film is being advanced from frame to frame. A standard video camera operates with an exposure time of one thirtieth or one sixtieth of a second, producing 60 "fields" of video per second. Two fields make up a "frame", or complete picture, 30 times per second. Because the exposure time is one thirtieth or one sixtieth of a second, the video camera may not see a full picture because the film camera shutter is opened to the film, i.e. not reflecting the picture to the video camera, whereby an annoying flicker of the image occurs. One standard way to avoid this flicker has been to run the video camera at the film camera rate to generate twenty-four video images per second with an exposure time of one twenty fourth of a second for each video image. Due to standard video camera design and video artifacts, it is often desirable to extract only a single field (one half vertical resolution) at the 24 Hz rate, then the images are digitally stored and read back at the standard NTSC (the U.S. National Television Standard Committee) or PAL (Phase Alternate Line standard used in other countries) rates, but then the images are limited to half their standard vertical resolution by this process. Moreover, by using only one half of the lines of the field, some picture details are lost and/or, during electronic deanamorphosing, an annoying interfield pulsing of picture details at 30 Hz may occur.

Still another problem with prior movie cameras that incorporate a video camera is that an image is formed on a ground glass surface before it is received by the video camera because the image must be observed by both the video camera and an eyepiece used by the photographer and therefore the quality of the video picture is not maximized.

It is an object of this invention to provide a motion picture camera with a video monitoring system that uses a standard video camera and standard video monitors, and the system deanamorphoses the image displayed on the video monitor when anamorphic lenses are used in the film camera.

Another object of this invention is to provide such a video monitoring system wherein the deanamorphosed image is displayed as one half of the vertical video picture, preferably in the middle, by the system without any modification to the conventional video monitor. A still further object of this invention is to provide an enhanced video picture, even though only one half of the horizontal lines are used for producing such picture, by interpolating in several ways the lines input by the video camera. Still another object of this invention is to improve the video image by extracting the image light before it is supplied to a ground glass surface for the eyepiece of the movie camera. Other and more detailed objects and advantages of this invention will appear from the following description and the accompanying drawings, wherein:

Figure 1:
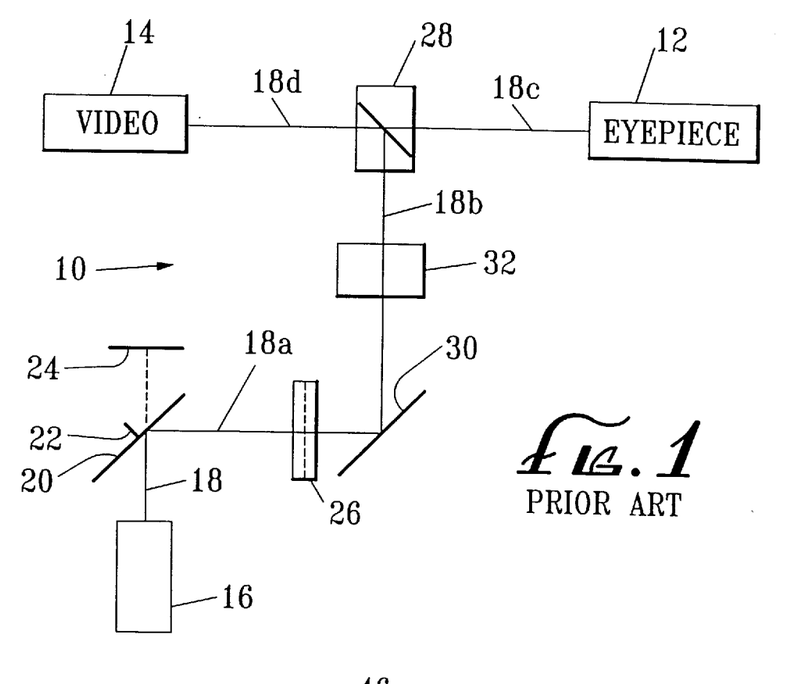
FIG. 1 is a simplified diagrammatic illustration of a conventional movie film camera having a video camera and an eyepiece.

Referring now to FIG. 1 that illustrates the arrangement of the components in a typical conventional motion picture film camera, generally designated 10, that camera includes both a monocular eyepiece 12 mounted on the camera for a person to view, with one eye, the picture that is being photographed and a video camera 14 in the film camera 10 for producing a video signal to one or more video monitors of the same picture that is being photographed through the same lens system. A detachable lens assembly 16 is mounted on the camera 10 on an optical axis 18 for receiving the light from the objects being photographed and directing that light along the optical axis 18. A reflective shutter 20, such as a conventional bow-tie shaped shutter rotating on the axis 22 with a reflective front surface and open spaces therebetween, is mounted in the camera in the path of the optical axis 18 and alternately allows the light to pass to the film plane 24 or be reflected along a continuation 18*a* of the optical axis 18. A real image is formed on a ground glass 26 when the light is reflected by the shutter 20 during movement of the film at film plane 24 and that image is viewable from the eyepiece 12 along a further continuation of the optical axis, such as through a prism 28 and a mirror 30. Similarly, the video camera 14 views the real image on the ground glass 26 along the continuation of the optical axis 18 through the prism 28 and the mirror 30. Because the eyepiece 12 and video 14 represent two different "viewing" sites, the optical path is split from the portion 18*b* of the optical path into two paths 18*c* and 18*d* by the prism 28 or any similar device, such as, a partial mirror. While the quality of the light and the image reaching the eyepiece is completely adequate for viewing by the cameraman, that quality often is not adequate for the video camera 14 when the image is displayed on a large monitor. Moreover, the image is formed on the ground glass 26 for viewing by the eyepiece, which is not necessary for the video camera and therefore the image quality at the video camera is not maximized. Furthermore, when the lens assembly 16 is an anamorphic lens system, an optical deanamorphosing lens system 32 must be provided, such as on the optical axis portion 18*b* of the optical path for horizontally expanding the image that has been horizontally squeezed by the anamorphic lens system 16 and this further reduces the quality of the light and image reaching the video camera 14 for transmission to a video monitor and/or video recorder.

Figure 2:
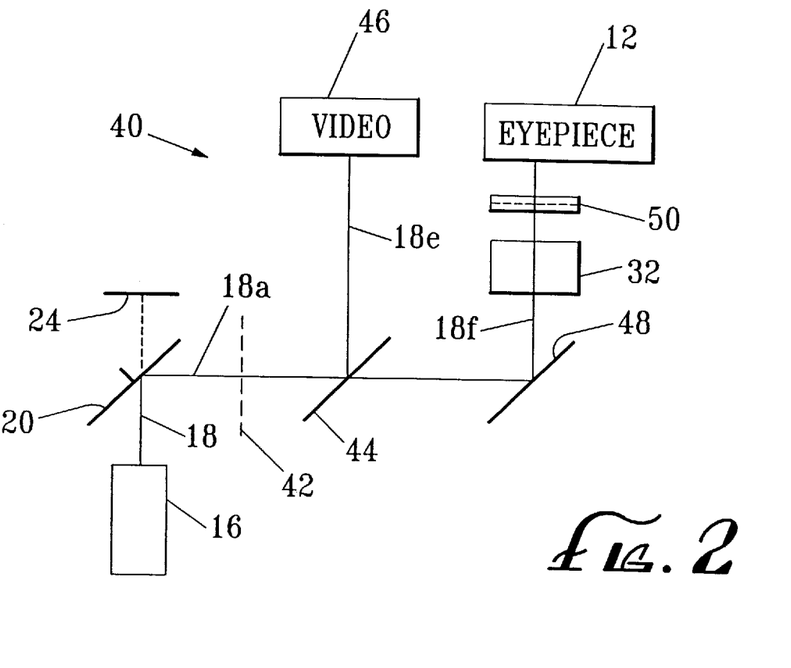
FIG. 2 is a simplified diagrammatic illustration of the film camera of this invention with a video camera and an eyepiece.

Referring now to FIG. 2, the motion picture film camera 40 of the present invention is diagrammatically illustrated similar to the illustration of the conventional camera in FIG. 1. Each component that is the same, is located in the same place and functions in the same manner will be identified by the same numeral. The detachable lens assembly 16 directs the light from the object along optical axis 18 to rotating shutter 20 that alternately allows the light to reach the film plane 24 or reflects the light along the optical axis portion 18*a*. An aerial image of the objects being photographed is formed on a plain glass plate 42 on the optical axis portion 18*a*. A portion of the light is reflected by partial mirror 44 (or divided by a prism) along an optical axis 18*e* to a video camera 46 and the remaining portion of the light passes through the partial mirror 44 to be reflected by a mirror 48 to an optical axis 18*f* to a ground glass 50 where a real image is formed and viewed through the eyepiece 12. When an anamorphic lens system 16 is used, an optical deanamorphosing device 32 is provided on optical axis 18*f* for horizontally expanding the image that has been horizontally compressed by the anamorphic lens system 16 so that the image will appear normal on the ground glass 50 for viewing through the eyepiece 12. However, the image that is transmitted along the optical path 18*e* to the video camera 46 remains horizontally compressed by the anamorphic lens system 16 and is not degraded by the deanamorphosing device 32 or ground glass 50. In the event the camera 40 is not provided with an eyepiece 12, such as camera with only a video monitor for the cameraman to observe, the mirror 44 may be a full mirror or the video camera 46 may be aligned on axis 18*a*, which arrangements also are within the scope of the present invention.

Figure 3:
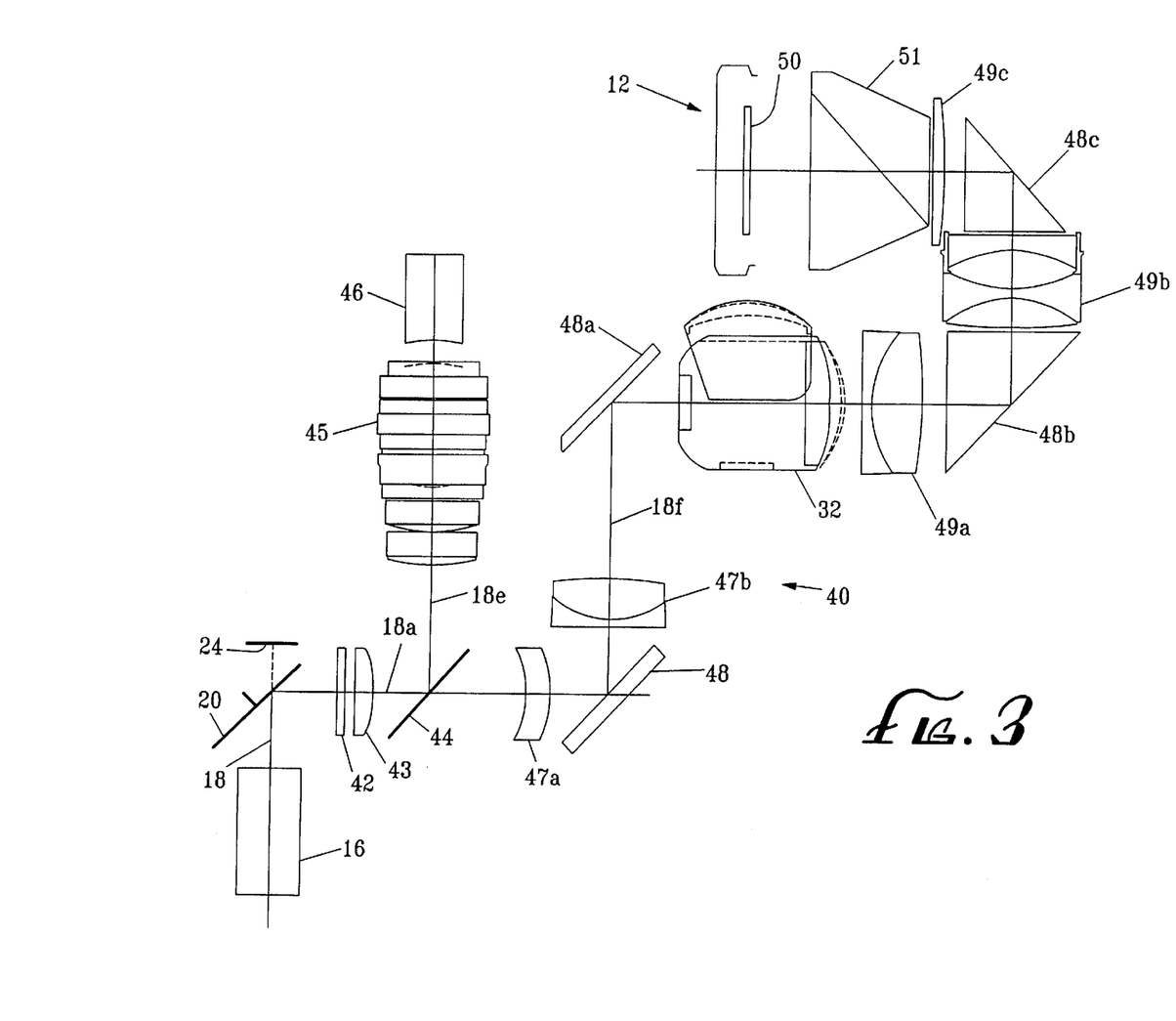
FIG. 3 is a more detailed diagrammatic illustration of the optical system of the film camera of this invention with a video camera and an eyepiece.

FIG. 3 is a more detailed diagrammatic illustration of the camera 40 than shown in FIG. 2 with a specific preferred arrangement of the various components, although other arrangements may be acceptable. Like components and axes in FIG. 3 are given the same numeral as the components and axes of FIG. 2 and the previous descriptions thereof will not be repeated here. The plain glass plate 42 near shutter 20 may be provided with lines for outlining the frame of the aerial image that is viewed by the video camera 46 through a field lens 43. A relay lens system 45 is provided on the optical axis portion 18*e* for the video camera 46, which may be of any conventional type such as a Sony Model XC-999. The light that passes through the partial mirror 44 along the optical axis portion 18*a* passes through conventional lenses 47*a* and 47*b* which form portions of a relay lens system on either side of the mirror 48. The mirror 48 may be a partial mirror that allows about 5% of the light to pass therethrough and a lighted image framing system (not shown) may be provided behind mirror 48 that is visible from the eyepiece 12. Another mirror 48*a* may be provided to change the direction of the optical axis 18*f* for convenient location of the optical components leading to the eyepiece 12. The deanamorphosing device 32 preferably includes a pivotally mounted lens system, as shown in dashed lines, to allow the deanamorphosing lens to be pivoted onto the optical axis when anamorphic lens is used as the lens system 16 and to be pivoted out of the optical axis when a spherical (non-anamorphic) lens is used as the lens system 16. Prisms 48*b* and 48*c* may be provided for changing the direction of the optical path to the eyepiece 12 and allow rotation of the eyepiece for convenient viewing. Relay lenses 49*a*, 49*b* and 49*c* are provided as needed for transmitting the image to the ground glass 50 for viewing by the eyepiece 12. A Pechan prism 51 preferably is provided for properly orienting the real image that is formed on the ground glass 50 for viewing through the eyepiece 12 by the cameraman in a conventional manner.

Figure 4:
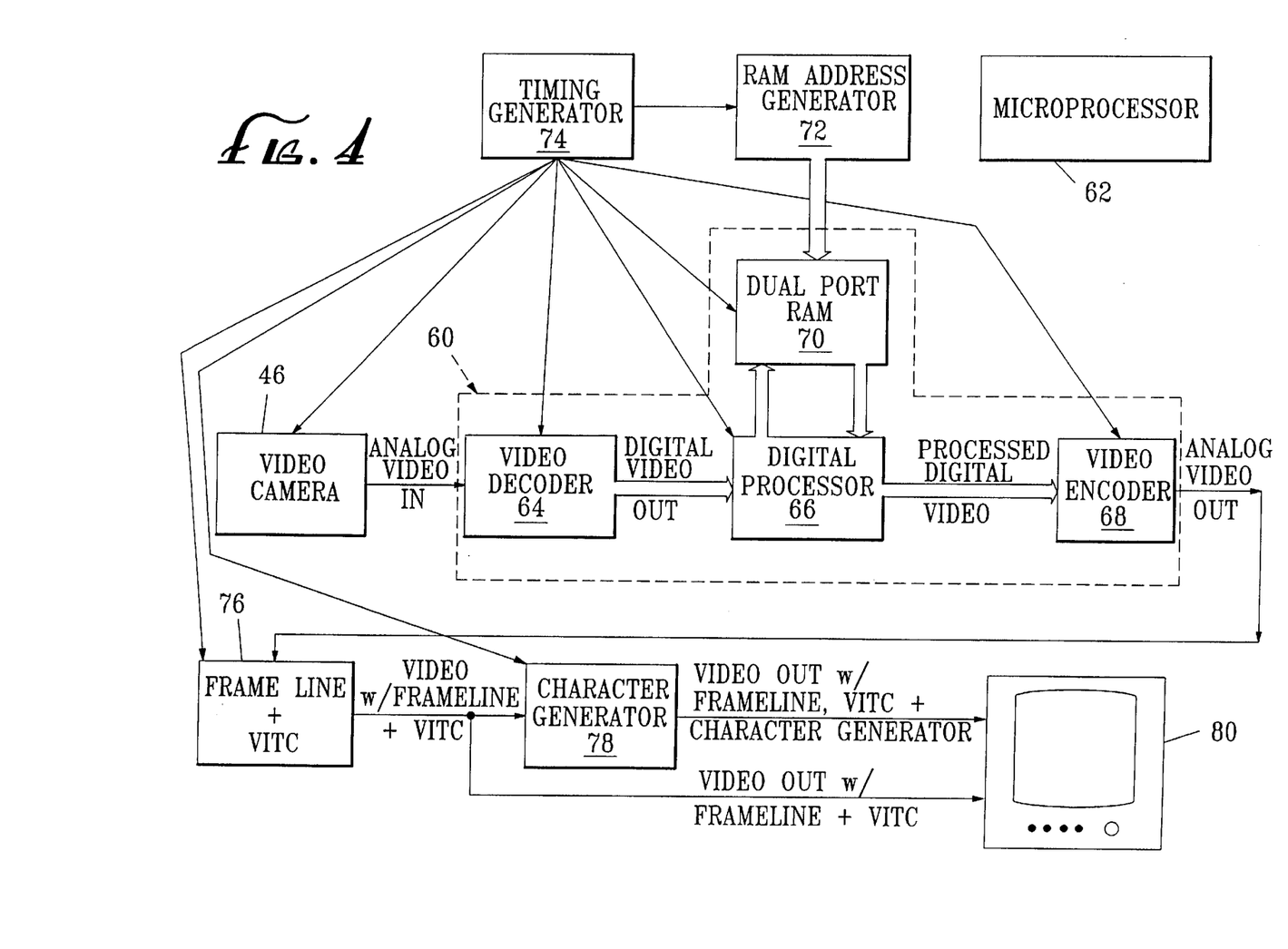
FIG. 4 is a block diagram of the components of the video monitoring system of this invention for the film camera.

Referring now to FIG. 4, an apparatus is diagrammatically shown for controlling and modifying the video signal produced by the video camera 46 for creating an improved video picture and deanamorphosing an image produced by an anamorphic lens system 16. The signal produced by the video camera 46 is supplied to a signal processing unit, generally designated 60, that is outlined by dashed lines in FIG. 4. The video signal is an analog signal that would produce a picture that is either normal in appearance if a spherical lens assembly 16 is used in the camera 40 or horizontally compressed if an anamorphic lens assembly 16 is used in the camera 40. A microprocessor 62 is connected to (not shown because clarity would suffer) and is used for setting the mode of operation of the signal processing unit 60, as well as the other components shown in FIG. 4 that will be described. For example, the microprocessor 62 sets one mode of operation of the signal processing unit 60 for a non-anamorphic analog video signal from camera 46 and another mode of operation for an anamorphic analog video signal from camera 46.

A video decoder 64 converts the analog video signal from camera 46 to digital video signals which are supplied to a digital processor 66 for processing, routing and interpolating the input digital signal and outputting a processed digital video signal to a video encoder 68 in a manner that will be described in more detail below. In the processing by digital processor 66, a digital signal is supplied to a dual port RAM (Random Access Memory) which stores the digitized images and other information that was received from the video camera 46 and returns a digital video signal to the digital processor 66 at the timing required by the digital processor 66, which processed digital video signal is then supplied to the video encoder 68. A RAM address generator 72 is connected to the dual port RAM 70 and serves as an address generator for reading and writing the correct addresses for the video signals, which typically include 256,000 pixels that form one field of a complete video picture. Under some circumstances, two separate one-field memories will be used to store the video data whereby, while the digital processor 66 writes into one field memory, the digital processor may read out from the same field memory or from the other field memory, depending on the relative read and write time. A timing generator 74 is connected to (as shown by the solid lines with arrowheads) and controls the timing of the video camera 46, the video decoder 64, the digital processor 66, the video encoder 68, the dual port RAM 70, the RAM address generator 72 and other components that will be described later.

The analog video signal output by the video encoder 68 is then processed by an inserter device 76 to produce the appropriate frame line and VITC (Vertical Interval Time Code). The inserter device 76 is controlled by frame line timing logic (part of FPGA) which is controlled by the microprocessor 62. The video signal with frame line and VITC is output from the inserter device 76 to either a character generator 78 or directly to one or more video monitors 80 where the picture taken by the video camera 46 is displayed in the proper format. The character generator 78 may be used to add camera data, time code or other information to the signal being supplied to the video monitor 80. The same video signal being supplied to the video monitor 80 may also be supplied to other video equipment (not shown) in a conventional manner such as a video tape recorder, a disc recorder, a video monitor on the camera 40, etc.

Figure 5A:
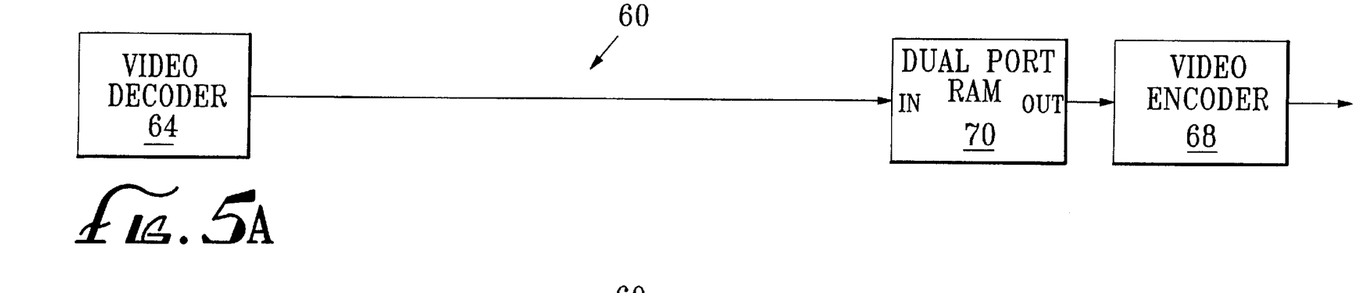
FIGS. 5A, 5B and 5C are diagrammatic views of three modes of operation of the digital processing section of the video monitoring system shown in FIG. 4.
Figure 5B:
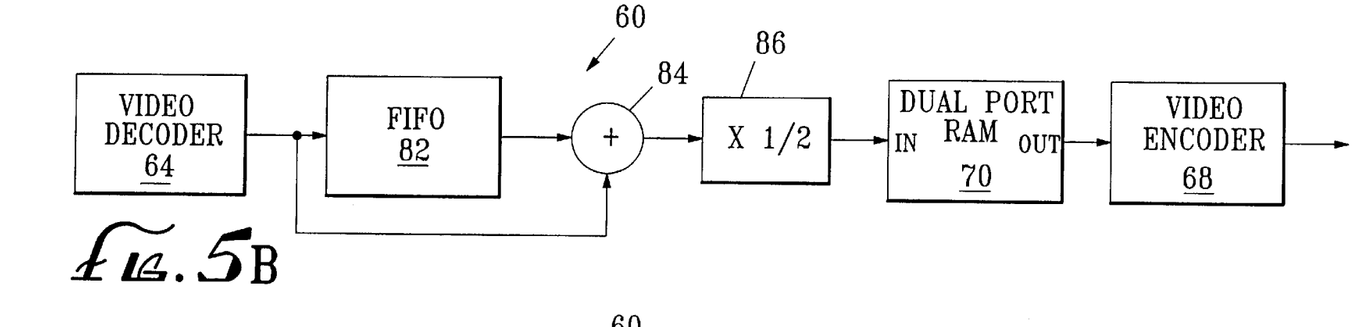
Figure 5C:
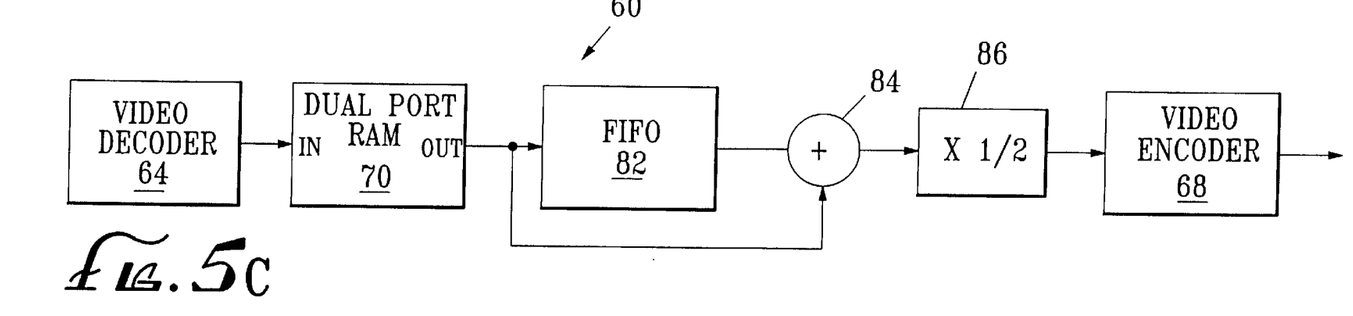

FIGS. 5A, 5B and 5C illustrate three different data path configurations for operation of the signal processing unit 60 in three different modes as controlled by the switches in the unit and settings by the microprocessor 62. Specifically, these three figures relate to interpolation of the video signal received from the camera 46 with FIG. 5A representing the simplest system where no interpolation is performed, such as with a non-anamorphic video signal, FIG. 5B representing a pre-interpolation data path for an anamorphic video signal, and FIG. 5C representing a post-interpolation configuration for a non-anamorphic video signal. The particular data path configuration is controlled by an operator manipulating control switches and the microprocessor 62 reads the control switches for then directing the programmable logic chips to process the data in the desired manner. From these three figures and the following description, it will readily appear to those skilled in the art that other data path configurations may be used and other interpolation methods may be used.

In FIG. 5A, the digital video signal from video decoder 64 is supplied as one field comprising the lines from the top to the bottom of a single picture received by the video camera 46 in a set period of time, which typically is one sixtieth of a second. There are 525 horizontal lines in a full video frame (comprised of one odd field and one even field). Of these 525 lines, 485 lines are "active", i.e. they contain actual picture information. For convenience, we will number these lines from top to bottom, where the first field, or half picture is obtained from only the odd lines, i.e. lines one, three, five, seven, etc. in the first one sixtieth of a second and the even lines two, four, six, eight, etc. are obtained in the next one sixtieth of a second, or the even lines are electronically developed by averaging the odd lines in a conventional manner. FIG. 5A represents a data path configuration wherein no interpolation is performed by the signal processing unit 60 but rather the video signal for a single (in this example odd) field is supplied to the dual port RAM 70, stored as necessary, and then supplied to the video encoder 68. Typically, if both the odd-field and even-field are being supplied by the video camera, the odd field is stored in RAM 70 until the even field is being received and then the odd and even fields are output in an interleaved manner as lines one, two, three, four, etc. For convenience, it is preferred that only one type (odd or even) of field is supplied by the video camera in this system. If only the odd-field is being transmitted to the RAM 70, then the odd field is stored and then output as both the odd and even lines, known as line doubling. The data path configuration of FIG. 5A may be appropriate for non-namorphic video signals when non-anamorphic lenses 16 are used in the camera for producing a picture on the video monitor 80 that is of normal size and proportion, although the quality is not as good as pictures using the interpolation methods described below.

FIG. 5B illustrates a pre-interpolation data path configuration for the signal processing unit 60 that is particularly suitable for processing an anamorphic video signal. For reasons that will become more clear hereinafter, only the odd-line field is supplied to the video decoder 46 and, of course, that field is horizontally compressed by the anamorphic lenses, such as by a factor of two, i.e. the width of the anamorphic picture is one half the width of the natural picture. The anamorphic analog video signal is supplied to both a FIFO (First In First Out) device 82, which may be an electronic chip, that delays the transmission of one horizontal line, i.e. line 1, line 3, line 5, etc. for the period of time it takes to transmit one line. Simultaneously, that odd line is transmitted directly to an adding device 84 which also receives a line of information from the FIFO device 82. Adding device 84 therefore adds the digital data for each pixel for consecutive odd lines by reason of the one line delay by FIFO device 82, i.e. 1+3, 3+5, 5+7, 7+9, etc. This electronically added signal is supplied to an averaging device 86 which, in effect, divides the added information in half and supplies a signal to the dual port RAM 70 which then supplies the processed average digital signal to the video encoder 68. The averaging of the consecutive odd lines produces an enhanced picture on the monitor 80 without flicker or pulsing, whereby it is the preferred method of interpolation, although other methods may be acceptable, such as averaging with a different weighting function, averaging after the RAM instead or before the RAM, or using the even-lines for averaging. The manner in which the digital video signal is output from the dual port RAM 70 for deanamorphosing the picture will be explained below.

FIG. 5C illustrates a data path configuration for post-interpolation that is particularly suitable for a non-anamorphic video signal and will be described as using only the odd-line field input from the video camera 46 to the video decode 64. The digitized video signal is input to the dual port RAM 70 and then simultaneously output to both the FIFO device 82 and the adding device 84, as shown by the lines and arrows. As described with respect to FIG. 5B, consecutive odd-lines are averaged by the devices 82, 84 and 86 to produce as a new horizontal video line an average of 1+3, 3+5, 5+7, 7+9, etc. (specifically, 1+3×½, etc.). Specifically, in ⅟₆₀ sec., an odd field goes from the RAM 70 to the video encoder 68 unaltered. In the next ⅟₆₀ sec., an even field goes to the encoder 68. The even field is created by averaging the unaltered odd lines. An example of this pattern of lines, as observed from top to bottom of the screen is 1, (1+3)/2, 3,(3+5)/2, 5, (5+7)/2, 7, etc. Thus, a full number of lines, both odd and even, are supplied to the video encoder 62 and eventually to the monitor 80 to provide a picture with normal proportions and enhanced quality that uses all of the lines on the monitor in the normal manner when non-anamorphic lenses 16 are being used. It should be noted that the components shown in FIGS. 5A, 5B and 5C comprise the signal processing unit 60 and the differences in the data path configurations are determined by the input of the control switches input to the microprocessor 62 or the inputs received by the microprocessor 62 from a remote (usually serial) communication link. In other words, the functions of microprocessor 62 may be remotely controlled, as well as by the control switcher.

Figure 6A:
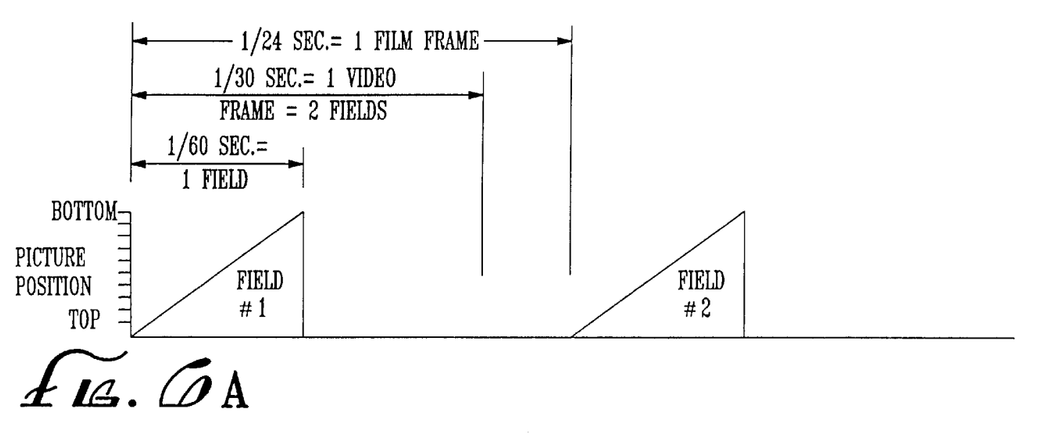
FIGS. 6A, 6B and 6C are timing diagrams for the dual port RAM of the video monitoring system of this invention.
Figures 6B, 6C:
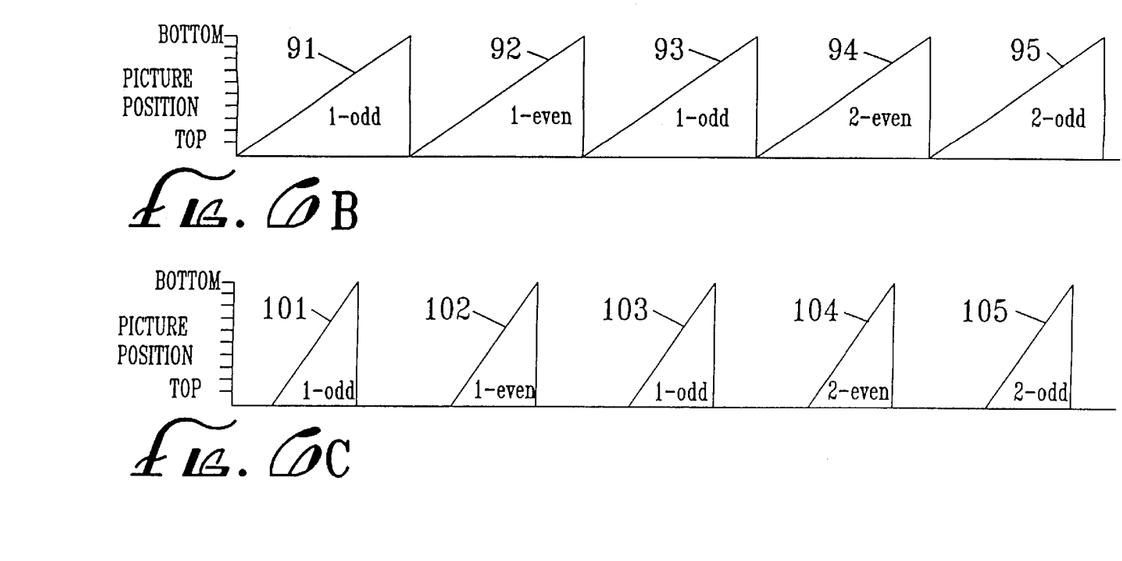

FIGS. 6A, 6B and 6C are timing diagrams that use the same horizontal timing scale for comparing the processes of inputting the analog video signal from camera 46 to the signal processing unit 60 and outputting the analog video signal from the signal processing unit 60 to display on the monitor 80. In the vertical direction, each of these three figures indicates the vertical position on the picture with the "TOP" being at the lower most position because the start of the input or output of any video signal is from the top of the picture frame. FIG. 6A represents the taking of a picture by the video camera 46 to output an analog video signal of the odd-lines from top to bottom as FIELD #1 in one sixtieth of a second which as discussed above, is the normal time period for a conventional video camera to take a single picture. A conventional camera may then take a second field (not shown in FIG. 6A) during the next one sixtieth of a second (which would occur during the horizontal distance labeled "1/30 SEC.=1 VIDEO FRAME=2 FIELDS") or the second field may be electronically created in the camera during this one thirtieth of a second in a conventional manner. However, the speed of the film advance mechanism and shutter 20 in the film camera 40 is 24 fps, which is represented by the legend 1/24 SEC.=1 FILM FRAME on FIG. 6A which is a longer period of time and not a multiple of the period of time in which the fields are taken by the video camera 46. Thus, in the film camera 40 the timing of the operation of the video camera 46 is preferably controlled by the timing generator 74 and microprocessor 62 to start taking a new field or picture every one twenty fourth of a second when the shutter 20 is closed and reflects the light from lens 16 to mirror 44 and then the video camera 46. Thus, following FIELD #1, the next picture taken by the video camera 46 is FIELD #2 and the film is exposed at the film plane 24 throughout the completion of FIELD #1 and the start of FIELD #2. As described with respect to FIGS. 5A, 5B and 5C, FIELD #1 and FIELD #2 are each comprised of only the odd-lines of the picture, i.e. lines 1, 3, 5, 7, etc. Subsequent FIELDS #3, #4, #5, etc. will also be produced every one twenty fourth of a second. Although it is preferred that each FIELD be started every one twenty fourth of a second to be synchronized with the shutter 20 for receiving a complete picture from top to bottom, it is also possible to operate the video camera 46 at its normal speed of 30 Hz, i.e. every one thirtieth of a second, but a portion of each field that does not coincide with the film shutter 20 being closed will not be received and therefore the quality of the picture will suffer, although the timing of the video system is simplified.

FIG. 6B represents the timing of the output of the analog video signal from the signal processing unit 60 when a non-anamorphic lens 16 is used, whereby deanamorphosing is not required. The legend "1-odd" (triangle 91) on FIG. 6B represents an output of all of the odd lines from FIELD #1 in FIG. 6A which, in the present example, is all of the lines in FIELD #1 since only the odd-lines are produced by the video camera 46. The legend "1-even" 92 represents the even lines delivered to the monitor 80 that are created from the FIELD #1 either as a duplicate as shown and described with respect to FIG. 5A or an interpolated set of even lines as shown and described with respect to FIG. 5C. The 1-odd lines 91 and the 1-even lines 92 are interleaved and simultaneously reproduced on the monitor 80 to complete the picture. The next legend "1-odd" to the right in FIG. 6B (the third triangle 93) represents a complete picture of odd-lines taken from FIELD #1, which must be taken from FIELD #1 in this example because FIELD #2 has not yet started to be recorded by the video camera 46, as shown by a comparison of the time lines of FIGS. 6A and 6B. The next picture signal (fourth triangle 94) produced on the time line of FIG. 6B is "2-even" which represents the even-lines produced from FIELD #2, such as by doubling (FIG. 5A) or interpolating (FIG. 5C). These third and fourth line sets, namely, 1-odd 93 and 2-even 94, are then interleaved as the next complete picture on monitor 80. This process of alternately creating odd and even line sets (95 etc) from the latest FIELD and the interleaving of the odd and even line sets is continued.

Figure 7A:
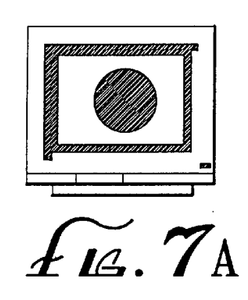
FIGS. 7A, 7B and 7C are diagrammatic illustrations of video monitor screens operating under different conditions.
Figure 7B:
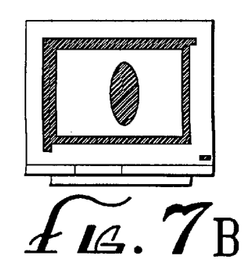

FIG. 7A represents a video monitor with a picture of a black circle that would result from the video camera 46 taking a picture of a black circle and using the aforedescribed process of FIG. 6B when non-anamorphic lenses 16 are used and produce a non-anamorphic image for the video camera 46. On the other hand, if anamorphic lenses 16 are used in photographing a black circle and the process of FIG. 6B is used, a black ellipse would be reproduced on the monitor 80 as shown in FIG. 7B because the width of the circle has been horizontally squeezed, such as by a factor of 2, and the image has not yet been deanamorphosed, as with the deanamorphosing lenses 32 of the prior art shown in FIG. 1.

Figure 7C:
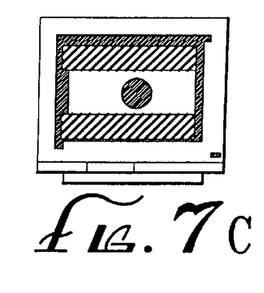

FIG. 6C represents the timing of the output of the lines of the analog video output from the signal processing unit 60 in accordance with this invention when anamorphic lenses 16 are used that produce a horizontally compressed image for the film 24 and video camera 46, such as being compressed by a factor of 2. Again, as with the terminology used in FIG. 6B, the legend "1-odd" (first triangle) represents the first set 101 of odd lines taken from the FIELD #1 which, in this example, is all of the odd lines recorded by the video camera 46 with no even lines. The next line set 102 identified by the legend "1-even" represents a complete set of even line signals produced from the FIELD #1. Similarly, the successive line sets 103, 104 and 105 of FIG. 6C correspond to the line sets 93, 94 and 95 of FIG. 6A with respect to being odd or even and as to the field from which they are taken. However, line sets 101–105 are processed by the signal processing unit 60 preferably in the manner shown in and described with respect to FIG. 5B, that is, each odd and even line is interpolated for enhancing the video picture. Moreover, as shown in the timing diagram FIG. 6C, there is a delay between the finish of each line set and the start of the next line set, such as shown for example between the vertical line of set 101 and the lower most end of the inclined line of set 102. During this delay between line sets, the signal processing unit 60 outputs either a black line signal or no signal to result in dark lines, which lines preferably are at the top one quarter and bottom one quarter of the picture on the video monitor 80 as shown by inclined stripes FIG. 7C. Specifically, for example, starting at the left end of timing diagram FIG. 6C, first a black signal is sent by the signal processing unit 60 for the top one quarter of the picture, then the 1-odd line set 101 is sent to the monitor for the middle one-half of the picture, and then black lines are sent to the monitor for the bottom one quarter of that picture and the next top one quarter of the picture before the next line set 102 is sent to the monitor for the middle one-half of the picture. As a result, the anamorphic image that was horizontally compressed by the anamorphic lens 16 is now deanamorphosed by horizontally expanding the image across only the middle one-half of the picture frame or, in other words, the image that was horizontally compressed by the anamorphic lens is now electronically compressed in the vertical direction by the signal processing unit 60 and the timing illustrated in FIG. 6C. Thus, for example, when the movie film camera 40 of this invention is taking the picture of a black circle with anamorphic lenses 16, the anamorphic image recorded by the video camera 46 that would be reproduced as an ellipse as shown in FIG. 7B is electronically deanamorphosed to produce a black circle of the proper proportions, as well as an entire picture of the proper proportions, in the center one-half of the monitor 80 with black areas across the top and bottom one quarters, as shown in FIG. 7C. By this arrangement, a conventional monitor 80 and other conventional video equipment such as recorders, editors, monitors, etc. may be used without any modification because the analog video-signal produced by the signal processing unit 60 results in a deanamorphosed picture of the proper proportions in the middle one-half of the video screen.

Although those skilled in the art will readily appreciate that numerous different types of electronic components and devices may be used for the above described signal processing unit 60 and associated components illustrated in FIG. 4, for completeness of disclosure, applicant's will identify those components that have been successfully used in this system but it will be understood that the invention is not limited to the use of the identified components. The video camera 46 may be a Sony XC-999 with the modifications discussed above, the microprocessor 62 may be an Intel 87C51, the video decoder 64 may be a Brooktree Bt819 and the video encoder 68 may be a Brooktree Bt856. Several different components described above may be included in an Xilinx XC4010 FPGA (Field Programmable Gate Array), such as the RAM address generator 72, timing generator 74 and portions of the other components, such as the dual port, RAM 70 and inserter device 76. The dual port RAM 70 also includes a Sony CXK 581020J, 128Kx8 bit SRAM. The inserter device 76 also includes an Elantec EL4441CS video multiplexer. The digital processor 66 may include an Altera PLD (Programmable Logic Device) EPM7032 and EPM7096, and a FIFO such as the IDT 7223. The character generator 76 may be of a conventional type, such as the NEC UPD645OGT. Further, although the preferred embodiment of the subject invention has been described in connection with a camera having a rotary mirror type of shutter 20, the invention is also applicable to other types of cameras, such as the so-called "pellicle" cameras that use a half silvered mirror, that use anamorphic lenses.

Still further, although progressive or non-interlaced video is the standard now used for computers and some sophisticated video systems, rather than writing every other line in every vertical scan of the picture (interlaced video), every line may be written every time. Techniques similar to those discussed herein could be used to deanamorphose the output of a progressive camera, to convert it to either deanamorphosed standard video (i.e. NTSC) or deanamorphosed progressive video. Converting progressive video to deanamorphosed progressive video would involve one interpolation step, to cut the number of active lines in half. Using the same notation, the progressive input frame would be: 1,2,3,4,5,6, etc. The result of the interpolation would be (1+2)/2,(3+4)/2,(5+6)2, etc. Converting progressive video to deanamorphosed standard video would involve the above interpolation (to cut the image from one frame to a single field of data), optionally followed by a second interpolation stage, preferably of the type shown in FIG. 5B.

However, having fully described the invention by the functions performed and identified the preferable components to be used, it is to be understood that the invention is not to be limited to the details herein set forth but rather the invention is of the full scope of the appended claims.

The invention claimed is:

1. In a video monitoring system for supplying a video picture to a conventional video monitor from a video camera in a movie film camera having, on an optical axis, an anamorphic objective lens, a film plane, and a reflective shutter, with the reflective shutter intermittently causing an anamorphic image from the objective lens to be alternately directed toward the film plane and the video camera, an improvement comprising;

means in the film camera for supplying the anamorphic image from the reflective shutter to the video camera, and signal processing means for receiving and processing a digital video signal from the video camera, said signal processing means producing a processed signal for the video monitor in a deanamorphosed form wherein portions of a screen of the video monitor omit all of the anamorphic image and another portion of the screen of the video monitor displays a substantially deanamorphosed image of substantially less height than the anamorphic image but of the same width as the anamorphic image.

2. The video monitoring system of claim 1 wherein, said signal processing means includes interpolation processing means for averaging the video signal by taking a line-by-line input of the video signal, combining the video signal of one line with the video signal of another subsequent line, and producing a line signal that averages the characteristics of the one line and the another subsequent line.

3. The video monitoring system of claim 1 wherein, a line-by-line input of the video signal is identified by consecutive odd numerals for a field comprising the anamorphic image, an interleaved line-by-line signal identified by consecutive odd numerals is developed by said processing means by averaging adjacent odd numbered lines, and the processed video signal is produced by averaging the odd and even lines and selecting alternate lines to produce the processed video signal for the deanamorphosed image.

4. The video monitoring system of claim 1 wherein, said means for supplying the anamorphic image to the video camera includes a partial mirror which also supplies the anamorphic image to an eyepiece through an optical deanamorphosing means on the optical axis.

5. The video monitoring system of claim 1 wherein, said signal processing means produces said processed signal as a predetermined number of horizontal video signal lines, which predetermined number is less than a normal number of video signal lines used by the video monitor for thereby reducing the vertical height of the anamorphic image.

6. The video monitoring system of claim 1 wherein, the video camera is controlled and synchronized with the reflective shutter for the video camera to record a full frame of the anamorphic image each time the shutter reflects the anamorphic image to the video camera.

7. The video monitoring system of claim 6 wherein, said signal processing means includes an image storage memory for retaining each said full frame of the anamorphic image for said signal processing means to produce said processed signal at a rate different from a rate of operation of the movie film camera.

8. In a video monitoring system for a movie film camera having, on an optical axis in the following order, an anamorphic objective lens, a reflective shutter, a film plane, an optical deanamorphosing lens and an eyepiece, with the reflective shutter intermittently causing an anamorphic image from the objective lens to be alternately directed toward the film plane and the eyepiece, an improvement comprising;

a video camera mounted in the film camera, a partial mirror mounted in the film camera on the optical axis between the shutter and the optical deanamorphosing lens and positioned to partially transmit and reflect, respectively, the anamorphic image to the eyepiece and the video camera, a video decoder means for receiving an analog video signal from the video camera and producing a digital video signal, a digital processing means for receiving and processing the digital video signal to produce a processed digital video signal, a video encoder means for receiving the processed digital video signal and producing a modified analog video signal, and a video monitor for receiving the modified analog video signal and displaying a visual image, said digital processing means including a dual port RAM and a digital processor to produce the processed digital signal in a deanamorphosed form wherein first portions of the visual image on the monitor omit all of the anamorphic image and second portions of the visual image on the monitor exhibit a deanamorphosed image of substantially the same height and width proportions as the anamorphic image when projected on a screen for viewing.

9. The video monitoring system of claim 8 wherein, said digital processing means includes interpolation processing means for averaging the digital video signal by taking a line-by-line input of the digital video signal, combining the signal of one line with the signal of another subsequent line, and producing a line signal that averages the characteristics of the one line and the another subsequent line.

10. The video monitoring system of claim 8 wherein, a line-by-line input of the video signal is identified by consecutive odd numerals for a field comprising the anamorphic image, an interleaved line-by-line signal identified by consecutive odd numerals is developed by said processing means by averaging adjacent odd numbered lines, and the processed video signal is produced by averaging the odd and even lines and selecting alternate lines to produce the processed video signal for the deanamorphosed image.

11. The video monitoring system of claim 8 wherein, said digital processing means produces said processed signal as a predetermined number of horizontal video signal lines, which predetermined number is less than a normal number of video signal lines used by the video monitor for thereby reducing the vertical height of the anamorphic image.

12. the video monitoring system of claim 8 wherein, the video camera is controlled and synchronized with the reflective shutter for the video camera to record a full frame of the anamorphic image each time the shutter reflects the anamorphic image to the video camera.

13. The video monitoring system of claim 12 said digital said signal processing means includes an image storage memory for retaining each said full frame of the anamorphic image for said signal processing means to produce said processed signal at a rate different from a rate of operation of the movie film camera.

14. In a video monitoring system for a movie film camera having, on an optical axis in the following order, an anamorphic objective lens, a film plane, a reflective shutter, an optical deanamorphosing lens and an eyepiece, with the reflective shutter intermittently causing an anamorphic image from the objective lens to be alternately directed toward the film plane and the eyepiece, an improvement comprising;

a video camera mounted in the film camera, a partial mirror mounted in the film camera on the optical axis between the shutter and the deanamorphosing lens and positioned to partially transmit and reflect, respectively, the anamorphic image to the eyepiece and the video camera, a video decoder means for receiving an analog video signal from the video camera and producing a digital video signal, a digital processing means for receiving and processing the digital video signal to produce a processed digital video signal, a video encoder means for receiving the processed digital video signal and producing a modified analog video signal, and a video monitor for receiving the modified analog video signal and displaying a visual image, said digital processing means storing the digital video signal in a memory on a line-by-line basis from top to bottom and then producing the processed digital signal by producing (1) a black line-by-line signal for substantially an upper one-quarter of the visual image, (2) a line-by-line signal retrieved from the stored digital video signal on an alternate line selection basis from the memory for substantially a middle one-half of the visual image for producing a deanamorphosed image as part of the visual image, and (3) a black line-by-line signal for substantially a bottom one-quarter of the visual image.

15. The video monitoring system of claim 14 wherein, said digital processing means includes interpolation processing means for averaging the digital video signal by taking a line-by-line input of the digital video signal, combining the signal of one line with the signal of another subsequent line, and producing a line signal that averages the characteristics of the one line and the another subsequent line.

16. The video monitoring system of claim 14 wherein, a line-by-line input of the digital video signal is identified by consecutive odd numerals for a field comprising the anamorphic image, an interleaved line-by-line signal identified by consecutive odd numerals is developed by said digital processing means by averaging adjacent odd numbered lines, and the processed digital signal is produced by averaging the odd and even lines and selecting alternate lines to produce the processed digital signal for the deanamorphosed image.

17. The video monitoring system of claim 14 wherein, a ground glass for forming an image viewable by the eyepiece is mounted on the optical axis between said partial mirror and said eyepiece.

18. In a video monitoring system for a movie film camera having, on an optical axis, an anamorphic objective lens, a reflective shutter, a film plane and a video camera, with the reflective shutter intermittently causing an anamorphic image from the objective lens to be alternately directed toward the film plane and the video camera, an improvement comprising;

a video decoder means for receiving an analog video signal from the video camera and producing a digital video signal, a digital processing means for receiving and processing the digital video signal to produce a processed digital video signal, a video encoder means for receiving the processed digital video signal and producing a modified analog video signal, and a video monitor for receiving the modified analog video signal and having a screen for displaying a visual image, said digital processing means including a dual port RAM and a digital processor to produce the processed digital signal in a deanamorphosed form wherein portions of said video monitor screen omit all of the anamorphic image and other portions of said video monitor screen exhibit a deanamorphosed image.

19. The video monitoring system of claim 18 wherein, said digital processing means includes interpolation processing means for averaging the digital video signal by taking a line-by-line input of the digital video signal, combining the signal of one line with the signal of another subsequent line, and producing a line signal that averages the characteristics of the one line and the another subsequent line.

20. The video monitoring system of claim 18 wherein, said digital processing means produces said processed signal as a predetermined number of horizontal video signal lines, which predetermined number is less than a normal number of video signal lines used by the video monitor for thereby reducing the vertical height of the anamorphic image.

21. The video monitoring system of claim 18 wherein, the video camera is controlled and synchronized with the reflective shutter for the video camera to record a full frame of the anamorphic image each time the shutter reflects the anamorphic image to the video camera.

22. The video monitoring system of claim 21 said digital said signal processing means includes an image storage memory for retaining each said full frame of the anamorphic image for said signal processing means to produce said processed signal at a rate different from a rate of operation of the movie film camera.

23. In a video monitoring system for supplying a video picture to a video monitor from a video camera located in a movie film camera having, on optical axes, an objective lens, a reflective shutter, a film plane, and a monocular eyepiece, wherein the reflective shutter intermittently causes an image from the objective lens to be alternately directed toward the film plane on a first optical axis and toward the video camera and eyepiece on a second optical axis, an improvement comprising;

means in the film camera on the second optical axis for splitting and supplying the image from the reflective shutter separately to both the video camera and the eyepiece, and a ground glass for receiving the image and being viewed by the eyepiece, said ground glass being located between said means and said eyepiece.

24. The video monitoring system of claim 23 wherein a glass plate is provided on the second optical axis, said glass plate having frame lines visible through said eyepiece.

25. The video monitoring system of claim 23 wherein a glass plate is provided on the second optical axis, said glass plate having frame lines visible to the video camera.

26. The video monitoring system of claim 23, further including frame line means visible to at least one of either the video camera or the eyepiece.

27. The video monitoring system of claim 23 wherein, said means for supplying the image to the video camera and eyepiece includes a partial mirror.

28. In a video monitoring system for a movie film camera having an objective lens, a reflective shutter, a film plane, and a monocular eyepiece, with the reflective shutter intermittently causing an image from the objective lens to be alternately directed toward the film plane and the eyepiece, an improvement comprising;

a video camera mounted in the film camera, and a partial mirror mounted in the film camera on an optical axis between the shutter and the eyepiece and positioned to partially transmit and reflect, respectively, the image separately to the eyepiece and the video camera.

29. The video monitoring system of claim 28 wherein, a ground glass is provided on the optical axis between said partial mirror and the eyepiece.

30. In a video monitoring system for a movie film camera having, on optical axes, an objective lens, a film plane, a reflective shutter, a video camera, a ground glass and a monocular eyepiece for viewing an image on the ground glass, wherein the reflective shutter intermittently causes an image from the objective lens to be alternately directed toward the film plane on the one hand and the video camera and the eyepiece on the other hand, an improvement comprising;

means in the film camera on an optical axis for directing the image from the reflective shutter to the video camera before the image reaches the ground glass.

31. The video monitoring system of claim 30 wherein said means is a partial mirror.

32. In a video monitoring system for supplying a video picture to a video monitor from a video camera located in a movie film camera having, an optical axis, an objective lens, a reflective shutter, a film plane, and a monocular eyepiece, wherein the reflective shutter intermittently causes an image from the objective lens to be alternately directed toward the film plane on a first optical axis and toward the video camera and eyepiece on a second optical axis, an improvement comprising;

a beam splitter mounted in the film camera on the second optical axis for supplying the image from the reflective shutter to both the video camera and the eyepiece, said beam splitter positioned on said second optical axis adjacent a location of the formation of a first image by light rays from the objective lens that are reflected directly from the reflective shutter, and a ground glass for receiving a second image for being viewed by the eyepiece, said ground glass being located on the second optical axis between said beam splitter and the eyepiece.

33. The video monitoring system of claim 32, wherein a glass plate is provided on the second optical axis between the reflective shutter and said beam splitter, said glass plate having frame lines.

34. The video monitoring system of claim 32, wherein a mirror is provided on the second optical axis between said beam splitter and said ground glass for bending the light rays in the film camera for selective positioning of the eyepiece.

35. The video monitoring system of claim 32, wherein the second optical axis includes a third optical axis portion extending from said beam splitter to the video camera, and an optical path on the second and third optical axis through the third optical axis portion from the reflective shutter to the video camera does not include a ground glass visible to the video camera.

* * * * *